United States Patent [19]

Welsh

[11] Patent Number: 4,927,690

[45] Date of Patent: May 22, 1990

[54] THERMOFORMABLE LAMINATED PACKAGING MATERIAL

[75] Inventor: Gary C. Welsh, Midland, Mich.

[73] Assignee: The Dow Chemical Company, Midland, Mich.

[21] Appl. No.: 277,079

[22] Filed: Nov. 28, 1988

Related U.S. Application Data

[63] Continuation-in-part of Ser. No. 818,439, Jan. 13, 1986, abandoned.

[51] Int. Cl.$^5$ .................. B65D 25/00; B32B 27/28
[52] U.S. Cl. .................. 428/35.7; 428/215; 428/516; 428/520; 428/475.8; 428/476.1
[58] Field of Search ............... 428/215, 517, 515, 516, 428/520, 475.8, 476.1, 35.7

[56] References Cited

U.S. PATENT DOCUMENTS

| | | | |
|---|---|---|---|
| 3,249,286 | 5/1966 | Palmer | 229/55 |
| 3,328,196 | 6/1967 | Sincock | 428/515 |
| 3,589,976 | 6/1971 | Erb | 428/516 |
| 3,748,218 | 7/1973 | Newman et al. | 428/517 |
| 4,048,428 | 9/1977 | Baird, Jr. et al. | 428/515 |
| 4,111,349 | 9/1978 | Buckler et al. | 428/516 |
| 4,112,181 | 9/1978 | Baird, Jr. et al. | 428/518 |
| 4,279,957 | 7/1981 | Hiraoka et al. | 428/212 |
| 4,359,499 | 11/1982 | Akao et al. | 428/515 |
| 4,440,824 | 4/1984 | Bonis | 428/516 |

FOREIGN PATENT DOCUMENTS

| | | |
|---|---|---|
| 6558033 | 5/1964 | Australia . |
| 7511430 | 12/1970 | Japan . |
| 51-19083 | 4/1975 | Japan . |
| 53-34881 | 9/1976 | Japan . |
| 55-57428 | 10/1978 | Japan . |
| 55-86751 | 12/1978 | Japan . |
| 55-144158 | 4/1979 | Japan . |
| 55-163164 | 6/1979 | Japan . |
| 56-130350 | 3/1980 | Japan . |
| 56-169063 | 6/1980 | Japan . |
| 5747631 | 9/1980 | Japan . |
| 58-189282 | 4/1982 | Japan . |
| 59115843 | 12/1982 | Japan . |
| 1140068 | 1/1966 | United Kingdom . |

Primary Examiner—James Seidleck

[57] ABSTRACT

A rigid thermoformable packaging material is provided which includes an outer layer of a nonfoamed oriented polystyrene and an inner layer of a functional polymer resin. The laminated packaging material can be produced by either thermal lamination or coextrusion. The packaging material is readily thermoformed into containers for medical or dental products or foods and is heat sealable, tough, resistant to chemicals, and resistant to cracking and tearing during handling by thermoforming equipment.

4 Claims, 2 Drawing Sheets

4,927,690

THERMOFORMABLE LAMINATED PACKAGING MATERIAL

This application is a continuation-in-part of application Ser. No. 818,439 filed Jan. 13, 1986, now abandoned.

BACKGROUND OF THE INVENTION

This invention relates to a rigid thermoformable packaging material and containers made therefrom. More specifically, it relates to a composite material having a layer of oriented polystyrene laminated to a functional polymer resin layer which serves as a barrier to moisture, odors, gases, chemicals and the like and/or improves the toughness and resistance to cracking and tearing of the material.

A wide variety of polymer resins are presently used to package medical and dental products as well as foods. These polymers are formed into sheets, films, and containers and include polystyrene, polyolefins, polycarbonate, acrylonitriles, polyvinyl chloride, polyethylene terephthalate polyesters, and copolymers such as styrene-butadiene and acrylonitrile-butadiene-styrene-polymethylmethacrylate. All of these resins have certain properties which make them desirable for these end uses.

However, when used as monolayer packaging materials, each group of resins has certain drawbacks. For example, while polyolefins have good moisture barrier properties, they are difficult to thermoform. Polystyrene, on the other hand, is readily thermoformable but has poor barrier properties. Poor resistance to some chemicals, and tends to be brittle.

It is known to laminate a plurality of layers of dissimilar polymer resins in an attempt to obtain materials having a combination of the desirable properties of the individual resins. For example, composite multilayer films of polystyrene and polyolefins have been made in attempts to take advantage of the stiffness and rigidity of polystyrene and strength, durability and barrier properties of the polyolefin, Erb, U.S. Pat. No. 3,589,976, teaches a composite film of a coextruded polystyrene core layer and polyolefin surface layers utilized as packaging materials for foods. Likewise, Japanese published applications Nos. 53-034,881; 55-144,158; and 55-163.164 generally teach composite films of polystyrene and polyolefins used as packaging materials.

However, for materials designed for use in packaging medical or dental products, or for certain food applications, the polymer resin or laminate structure must possess a multiplicity of attributes. Not only must the packaging material be rigid, but it also must resist cracking and tearing brought about by clamping equipment used on commercial thermoforming, filling, and sealing systems. Additionally, the material must be heat sealable and yet have clean peel characteristics upon opening. Finally, the packaging material desirably has good light transmission characteristics is resistant to chemical attack and is stable to radiation sterilization procedures. Heretofore, none of the commonly utilized packaging materials used in the art have possessed these desirable combinations of properties.

Accordingly, the need still exists in the art for a cost effective packaging material possessing all of the desirable attributes set forth above for use in the packaging of medical or dental products as well as certain foods.

SUMMARY OF THE INVENTION

The present invention meets that need by providing a rigid thermoformable packaging material and a container made therefrom for use in packaging medical and dental products and certain foods.

According to one aspect of the present invention, a rigid thermoformable packaging material is provided which includes an outer layer of a nonfoamed oriented polystyrene and an inner layer of a functional polymer resin laminated thereto selected from the group consisting of low density polyethylene high density polyethylene and nylon. This functional layer may be selected to give the laminated packaging material barrier properties, chemical resistance, toughness, or other desired characteristics. The outer layer of oriented polystyrene resin has a thickness of between about 1 to about 30 mils, while the inner polymer layer has a thickness of between about 0.5 to about 10 mils. The oriented polystyrene makes up from about 78% to about 96.5% by weight of the overall mass of the laminate.

The packaging material of the present invention may be readily thermoformed into a variety of rigid containers for medical, dental, and food products. The combination of layers in the laminate structure provide a container which has a high flexural modulus, toughness, and resistance to tearing and cracking during handling by automated form, fill, and seal equipment. Additionally, the packaging material is heat sealable to a variety of lid stocks.

The packaging material of the present invention may be produced by a thermal lamination process or may be coextruded. In the thermal lamination process, a layer of a nonfoamed oriented polystyrene having the thickness described above is joined together with a second layer of a functional polymer resin, the second layer of polymer resin having an adhesive layer thereon. The adhesive layer preferably comprises a copolymer of ethylene with vinyl acetate or ethylene with acrylic acid.

After the layers are joined, they are heated to a temperature sufficient to activate the adhesive layer and bond the oriented polystyrene layer to the second polymer resin layer over substantially the entire surfaces thereof. The temperature is controlled to insure that stress relaxation of the oriented polystyrene layer does not occur as an unoriented polystyrene would be excessively brittle and tend to crack and tear, even when laminated to another polymer resin.

An alternate procedure for forming the packaging material of the present invention comprises coextruding a laminate structure which includes a first layer of a nonfoamed polystyrene, a second layer of a functional polymer resin selected from the group consisting of low density polyethylene, high density polyethylene, polypropylene and nylon, and an adhesive layer sandwiched between the first and second layers. The adhesive layer preferably comprises a copolymer of ethylene with vinyl acetate or ethylene with acrylic acid.

The coextruded laminate is then stretched causing at least the polystyrene layer to become oriented. Preferably, this stretching occurs in both the machine direction and cross-direction to produce a biaxially oriented material.

Accordingly, it is an object of the present invention to provide a rigid thermoformable packaging material and method of manufacture, as well as a container made therefrom, which is cost effective, chemically resistant, tough, and resistant to tearing or cracking when handled by thermoforming equipment. This and other objects and advantages of the invention will become apparent from the following detailed description, the accompanying drawings, and the appended claims.

DETAILED DESCRIPTION OF THE PREFERRED EMBODIMENTS

Figure 1:
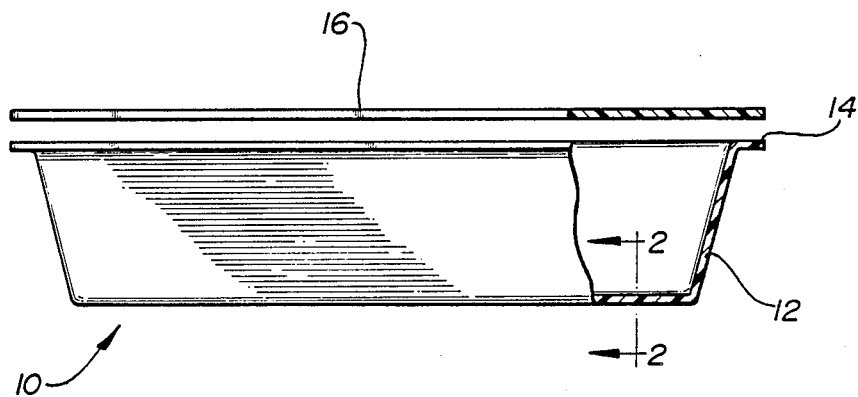
FIG. 1 is an elevation, partially broken away, of a container made in accordance with the present invention.
Figure 2:
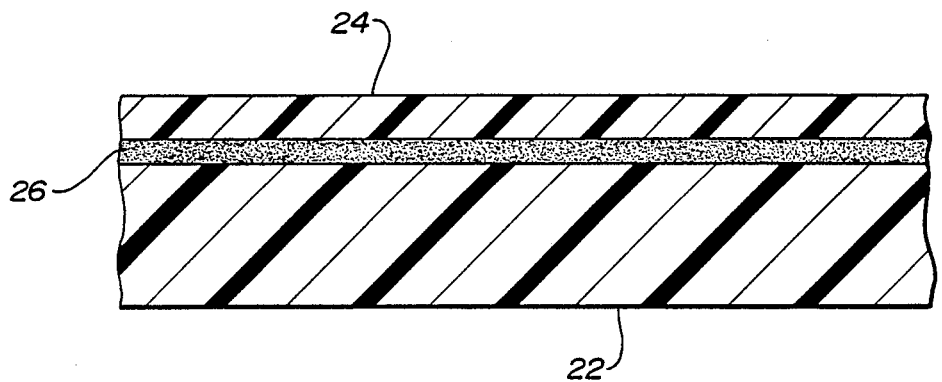
FIG. 2 is a cross-sectional view taken along line 2—2 of FIG. 1 showing the detail of the laminate structure of the packaging material.

Referring now to FIGS. 1 and 2, there is illustrated a container or tray 10 into which medical or dental products or a food may be packed. The wall 12 and rim 14 of container 10 comprise the laminated packaging material of the present invention. Container 10 may be formed by conventional thermoforming equipment as described in further detail below. A lid 16, which may be heat sealed in a conventional manner to rim 14 of container 10 is also illustrated. Lid 16 may be made of the laminated packaging material of the present invention or may be a different monolayer or multilayer polymer resin. For example, suitable heat sealable lid stock may be a spun-bound polyolefin sold by Dupont under the designation Tyvek (trademark).

As best shown in FIG. 2, the rigid thermoformable packaging material of the present invention includes an outer layer 22 of a nonfoamed oriented polystyrene. By "oriented", it is meant that the polystyrene has undergone stretching in at least one axial direction, and preferably has been biaxially stretched to produce a tougher resin which will be more resistant to tearing and cracking. Use of an oriented polystyrene is critical to the practice of the present invention as unoriented polystyrene resin is excessively brittle and tends to crack and tear during handling by the clamping systems utilized by conventional thermoforming systems.

The thickness of oriented polystyrene layer 22 is between about 1 to about 30 mils (0.025 to 0.75 mm), and preferably about 8 to about 12 mils (0.2 to 0.3 mm).

The laminate also includes an inner layer 24 of a functional polymer resin selected from the group consisting of low density polyethylene, high density polyethylene, polypropylene and nylon. The functional polymer resin layer has a thickness of between about 0.5 to about 10 mils (0.012 to 0.25 mm). The particular polymer resin utilized depends on the particular properties or characteristics desired in the laminated packaging material.

For example, where the material is to be utilized to contain medical or dental products, the inner layer is preferably a polyolefin such as low density polyethylene. The polyethylene is resistant to chemicals and protects the outer polystyrene layer from chemical attack. For instance, the plasticizer used in many medical products made of polyvinylchloride will attack polystyrene. Polyethylene will also provide the necessary toughness (elongation) to enable the composite material to withstand normal handling and clamping operations during thermoforming. Finally, the polyethylene has been found to be unaffected by radiation sterilization procedures utilized for medical and dental products.

The inner and outer layers of the packaging material are bonded together across substantially their entire surfaces by an adhesive layer 26 which preferably comprises a copolymer of ethylene with vinyl acetate or ethylene with acrylic acid. Preferably, the inner layer 24 and adhesive layer 26 are coextruded together initially to form a two layer laminate. Inner layer 24 and outer layer 22 can then be thermally laminated together as described in further detail below.

It is important to the practice of the present invention that the oriented polystyrene outer layer comprise from about 78% to about 96.5% of the weight overall of the packaging material. It has been found that a composite layered material formed within this range and in accordance with the present invention has the necessary structural rigidity, stiffness, and high flexural modulus to form a crush-resistant package while exhibiting the necessary toughness and chemical resistance required. When the composite material contains less than about 78% by weight of the oriented polystyrene, the reduced flexural modulus and decreased stiffness require the increasing of the thickness of the package to obtain sufficient stiffness. This increases materials costs and complicates the thermoforming operation.

On the other hand, when the composite material contains greater than about 96.5% by weight of oriented polystyrene, it has been found that there is an unacceptable level of cracking and tearing of the laminate during handling and clamping procedures in the thermoforming operation. Additionally, such laminates exhibit reduced chemical resistance.

Figure 3:
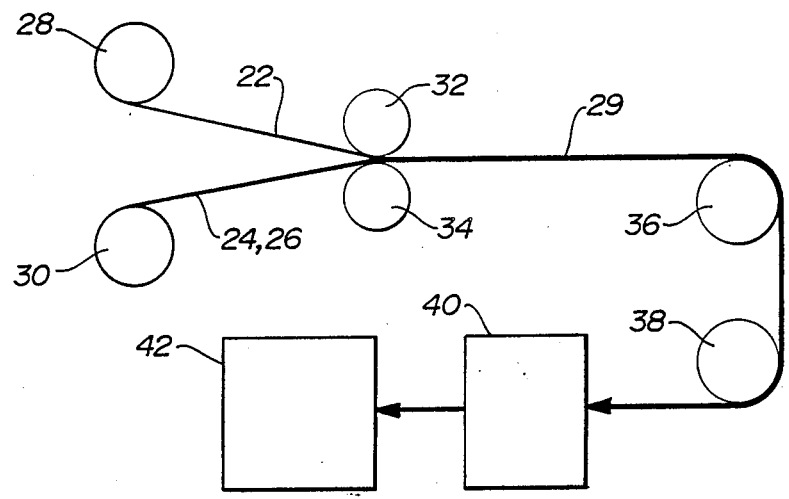
FIG. 3 is a schematic illustration of a preferred thermal lamination process for making the packaging material, including thermoforming of the laminate into a container.

Referring now to FIG. 3, the thermal lamination process for forming the composite packaging material of the present invention is illustrated. Inner layer 22 of oriented polystyrene is unwound from roll 28 and outer composite layer 24, 26 (which previously has been formed by, for example, a coextrusion process) is unwound from roll 30, and both layers are joined together at the nip between heated rolls 32 and 34 respectively. Heated rolls 32 and 34 are maintained at a temperature sufficient to activate adhesive layer 26 and cause it to bond the inner and outer layers together but insufficient to cause stress relaxation of the oriented polystyrene layer 22. As the stress relaxation temperature of oriented polystyrene is approximately 230° F., the temperature of the heated rolls as well as the line speed of the material through the rolls should be adjusted to maintain the temperature of the layers below about 230° F. It has been found that a suitable temperature range for heated rolls 32 and 34 is between about 260° to 280° F. for a line speed of between about 50–70 feet per minute.

Laminated packaging material 29 is then passed around rollers 36 and 38 to a conventional vacuum thermoforming apparatus, the details of which are well-known in this art. Rollers 36 and 38 may be chilled if desired to cool down the laminate. Alternatively, laminate 29 may be wound into spools (not shown) and stored.

After thermoforming and trimming, individual containers (not shown, but having a structure as illustrated, for example, in FIG. 1) are then passed to a filling and sealing station 42 where medical or dental products or food, as the case may be, are placed in the containers and lid 1 is sealed thereto. The laminated packaging material of the present invention provides an excellent surface for directly heat sealing spun-bound polyolefin (Tyvek) lid stock. Typically, such a lid stock requires a costly coating before it can be heat sealed to many existing medical packaging materials. The polyethylene inner layer 24 of the packaging material of the present invention will directly heat seal to such lid stock without the need for precoatinq. Moreover, once heat-sealed, such lid stock can be cleanly peeled off in total from the material utilized in the present invention. This "clean peel" capability eliminates the possible contamination of the contents of the container by fragments of the lid material. This "clean peel" characteristic also aids in maintaining the removed lid intact and any instructions, which are typically printed on the inside of the lid, are preserved, In an alternate embodiment of the invention which is not shown, a portion of rim 14 on container 10 may be extended to form an end flap label. The end flap can be heated with sonic welding horns and then folded 90 degrees. This permits the contents of the containers to be identified through information printed on an end flap when the containers are stacked on top of one another.

Figure 4:
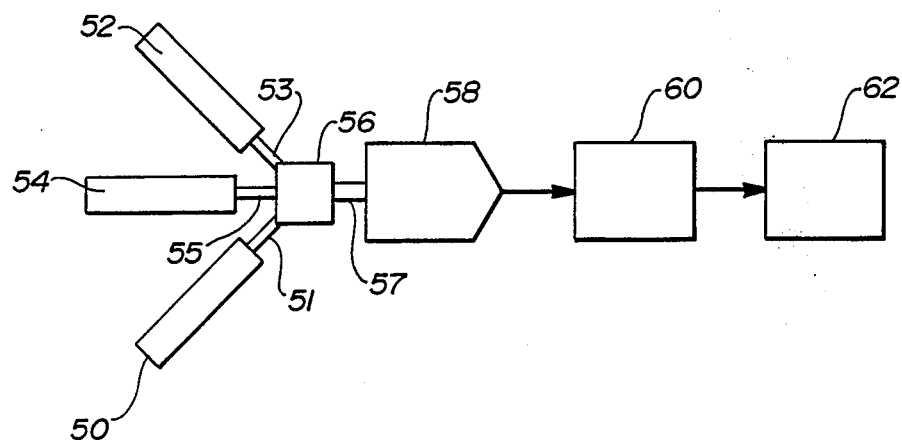
FIG. 4 is a schematic illustration of an alternate coextrusion process for making the packaging material of the present invention.

In an alternate process for forming the packaging material, FIG. 4 illustrates a coextrusion technique which utilizes in-line stretching and orientation of the laminate. As shown, conventional extruders 50, 52, and 54 serve as sources of supply for the inner, outer, and adhesive layers, respectively. Conduits 51, 53 and 55 supply heated resin to coextrusion feedblock 56. There, the resins merge together to form under pressure a unitary three-layer stream 57 having a generally circular cross-section.

This stream 57 is then passed into a conventional extrusion die 58 and is extruded into a continuous sheet. The sheet is then passed through sequential stretching stations 60 and 62 which stretch the sheet in the machine direction and in the cross direction, respectively, to produce a biaxially oriented polystyrene layer 22 in the composite material. The composite material may then be thermoformed, filled, and sealed as described above to produce finished, sealed containers for medical or dental products or foods.

Having described the invention in detail and by reference to preferred embodiments thereof, it will be apparent that modifications and variations are possible without departing from the scope of the invention defined in the appended claims.

What is claimed is:

1. A rigid, thermoformable packaging material for medical, dental, and food packages comprising of an outer layer consisting essentially of a nonfoamed biaxially oriented polystyrene having a thickness of between about 1 to about 30 mils, and an inner layer laminated to said outer layer of a polymer resin selected from the group consisting of low density polyethylene, high density polyethylene, polypropylene and nylon, said inner layer having a thickness of between about 0.5 to about 10 mils, and wherein said oriented polystyrene comprises from about 78% to about 96.5% by weight of said packaging material.

2. The packaging material of claim 1 in which said inner layer is heat sealable.

3. The packaging material of claim 1 having a flexural modulus of between about 280,000 to about 510,000 psi.

4. A rigid, thermoformable packaging material for medical, dental and food packages consisting essentially of an outer layer of a nonfoamed biaxially oriented polystyrene having a thickness of between about 1 and about 30 mils, and an inner layer laminated to said outer layer of a polymer resin selected from the group consisting of low density polyethylene, high density polyethylene, polypropylene, and nylon, said inner layer having a thickness of between about 0.5 to about 5 mils, said inner layer and outer layer including therebetween an adhesive film layer comprising a copolymer of ethylene with vinyl acetate or ethylene with acrylic acid, and wherein said oriented polystyrene comprises from about 78% to about 96.5% by weight of said packaging material.

* * * * *